(12) United States Patent
Bowie

(10) Patent No.: US 9,169,956 B2
(45) Date of Patent: Oct. 27, 2015

(54) PIPELINE ISOLATION TOOL AND METHOD

(75) Inventor: Angus George Bowie, Aberdeen (GB)

(73) Assignee: Stats (UK) Limited, Aberdeenshire (GB)

( * ) Notice: Subject to any disclaimer, the term of this patent is extended or adjusted under 35 U.S.C. 154(b) by 336 days.

(21) Appl. No.: 13/816,059

(22) PCT Filed: Aug. 9, 2011

(86) PCT No.: PCT/GB2011/001198
§ 371 (c)(1),
(2), (4) Date: Apr. 2, 2013

(87) PCT Pub. No.: WO2012/020224
PCT Pub. Date: Feb. 16, 2012

(65) Prior Publication Data
US 2013/0199651 A1    Aug. 8, 2013

(30) Foreign Application Priority Data

Aug. 9, 2010 (GB) .................................. 1013370.0

(51) Int. Cl.
| | |
|---|---|
| *F16L 55/11* | (2006.01) |
| *F16L 55/132* | (2006.01) |
| *F16L 55/128* | (2006.01) |
| *F16L 55/16* | (2006.01) |
| *F16L 55/28* | (2006.01) |

(52) U.S. Cl.
CPC ............ *F16L 55/132* (2013.01); *F16L 55/1283* (2013.01); *F16L 55/1608* (2013.01); *F16L 55/28* (2013.01)

(58) Field of Classification Search
CPC ........ F16L 55/12; F16L 55/16; F16L 55/1283
USPC .................... 138/89, 93, 97; 405/156, 170
See application file for complete search history.

(56) References Cited

U.S. PATENT DOCUMENTS

| | | | | |
|---|---|---|---|---|
| 3,908,682 | A | * | 9/1975 | Thompson ................. 137/15.07 |
| 4,026,329 | A | * | 5/1977 | Thompson ...................... 138/97 |
| 4,077,435 | A | * | 3/1978 | Van Scoy ........................ 138/93 |
| 4,314,577 | A | * | 2/1982 | Brister ............................. 137/13 |
| 4,465,104 | A | | 8/1984 | Wittman et al. |
| 4,909,281 | A | | 3/1990 | Reaux |
| 4,991,651 | A | * | 2/1991 | Campbell ...................... 166/122 |

(Continued)

OTHER PUBLICATIONS

International Search Report for PCT Application No. PCT/GB2011/001198 mailed Feb. 2, 2012.

*Primary Examiner* — Patrick F Brinson
(74) *Attorney, Agent, or Firm* — Carlson, Gaskey & Olds, P.C.

(57) ABSTRACT

An isolation tool is adapted for location in a pipe and includes a first plug module and a second plug module. The first plug module is configurable to grip the pipe and permit fluid bypass, to prevent fluid bypass without gripping the pipe, and to isolate the pipeline with gripping and leak tight sealing allowing a section to be fully de-pressurised. In use, the first and second plug modules are inserted into opposite ends of the pipe. The first plug module is pigged to a location in the second mode with a seal against the pipe but no grip then is configured in the fluid bypass mode when the second plug module is travelling through the pipe so that fluid displaced by the second plug module bypasses the first plug module. The second plug module and first plug module are then sealingly secured to the pipe to isolate a section of the pipe wall having a restriction.

19 Claims, 15 Drawing Sheets

(56) References Cited

U.S. PATENT DOCUMENTS

| | | | |
|---|---|---|---|
| 5,029,614 A | * 7/1991 | Lara et al. | 138/90 |
| 5,924,454 A | * 7/1999 | Dyck et al. | 138/89 |
| 6,241,424 B1 | 6/2001 | Bath et al. | |

\* cited by examiner

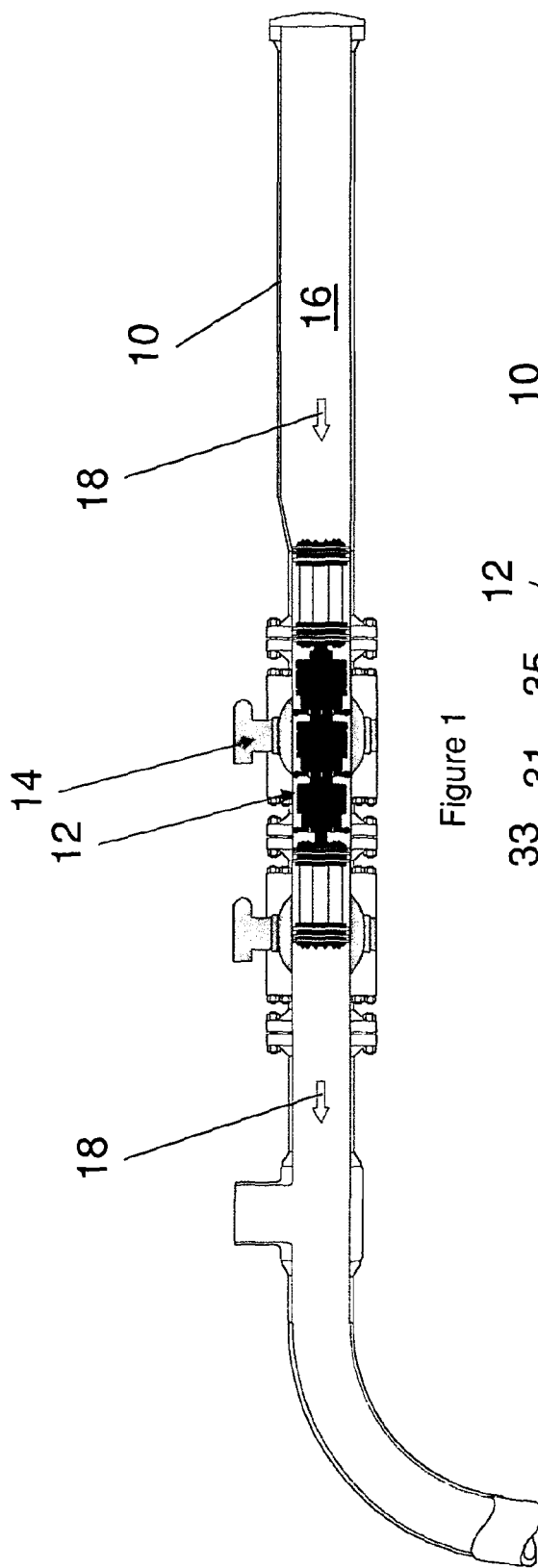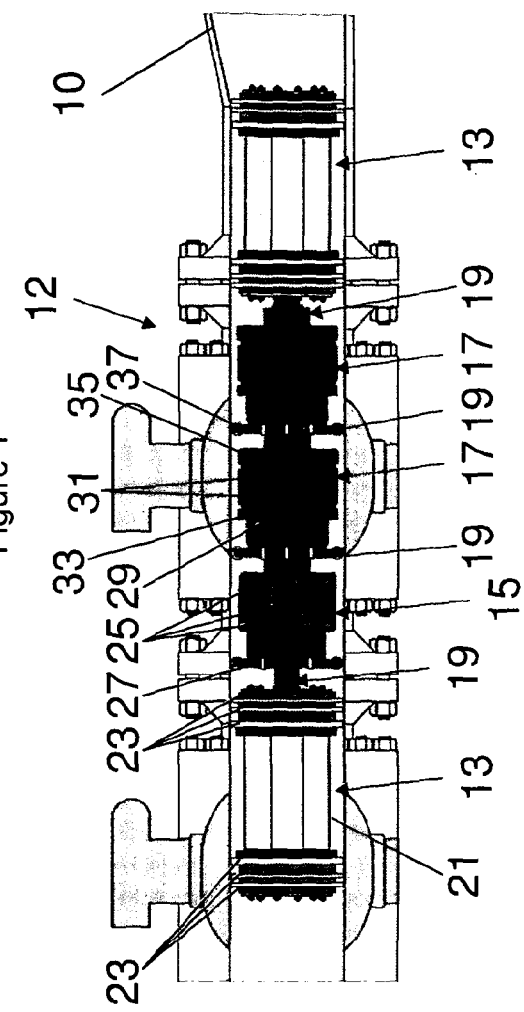

PIPELINE ISOLATION TOOL AND METHOD

REFERENCE TO RELATED APPLICATIONS

This application is a United States National Phase of PCT Application No. PCT/GB2011/001198 filed on Aug. 9, 2011, which claims priority to United Kingdom Application No. 1013370.0 filed on Aug. 9, 2010.

FIELD OF THE INVENTION

This invention relates to pipeline isolation and, in particular, but not exclusively, to isolation of a section of a pipeline having a restriction or reduced inner diameter.

BACKGROUND TO THE INVENTION

Transporting substances, in particular fluids, over distance is required in many industries, this typically being achieved via a system of pipes, tubes, pipe modules, pipelines and the like. In the oil and gas exploration and production industry, for example, pipelines are used in many surface, subsurface and subsea environments to transport oil and/or gas, often over large distances.

In some instances, it may be necessary to isolate a section of a pipeline for repair or replacement. However, isolation of a section of pipe with piggable tools can be limited or prevented where a section of the pipe bore has a restriction or section of reduced inner diameter. This may be the case, for example, where a section of pipe is dented or otherwise damaged, thereby hindering or preventing deployment of isolation tooling through the pipe bore.

A number of solutions have been proposed for isolating sections of pipe where the pipe bore is restricted.

For example, local isolation can be achieved through the use of a hot tap inserted isolation tool such as the BISEP tool from STATS (UK) Limited. The BISEP offers double block and bleed isolation of a pipe through a single penetration in the pipe. Although hot tap inserted isolation tools offer an effective and economic solution for many applications, in some subsea applications it may be preferred to use remotely operated isolation tools or plugs, for example where access to the pipe is limited or not possible. Remotely operated isolation tools may also be preferred to minimise the vessel time and expense which may otherwise be necessary in transporting tooling to site.

Alternatively, a pigging isolation tool may be used, the pigging tool located within the pipe bore and propelled through the pipe by a pressure force generated by the pipe flow. In instances where restriction of the pipe bore is relatively small, a two plug train may be used having a high jump isolation plug (one with a large clearance to the pipe bore when deactivated), the tools being launched from one end of the pipe such that the front plug of the train passes the restriction/damaged section of pipe. The two plugs can then be set to isolate the restricted/damaged section of the pipe.

However, there is a limit to the radial jump (clearance between the plug body and the pipe bore) that can be accommodated by a double block and bleed mechanical isolation plug and in instances where restriction of the pipe bore is more substantial, use of a high jump isolation tool to pig past the bore restriction may not be feasible. For example, it is considered that current technology puts this limit at between about 5% and about 10% bore restriction dependant on pipe diameter.

For larger bore restrictions, and in particular those where the restriction is greater than 10% of the pipe bore, it may be desirable to pig tooling from both ends of the pipe and approach the restriction from both sides. However, in many situations this does not represent an effective solution. For example, in cases where there is no breach in the pipe, pigging from both ends may result in fluid in the pipe between the plugs being compressed, thereby raising the pipe pressure and risking damage to, or rupture of, the pipe or preventing pig movement.

SUMMARY OF THE INVENTION

According to a first aspect of the present invention there is provided a method for isolating a section of a pipe, the method comprising:

locating a first plug module in a pipe in a first mode using a sealing pigging array with no or minimal bypass, the first plug module configurable in a second mode to permit fluid bypass of the pigging array and the first pipe module while securing the first plug module against the pipe and configurable in a third mode to isolate the pipeline, retaining pressure on one side of the tool while allowing the other side to be fully vented;

locating a second plug module in the pipe while the first plug module is in the second mode such that fluid displaced by location of the second plug module may bypass the first plug module;

securing the second plug module and the first plug module to the pipe to isolate the pipe section between the modules; and configuring the first plug module in the first mode to prevent fluid bypass of the pigging array for pigging both plugs to one end for removal.

The present invention also relates to an isolation tool comprising a first plug module as described above, and also to an isolation tool comprising first and second plug modules as described above.

The second plug module and the first plug module may be secured to the pipe to isolate the pipe section between them using double block and bleed isolation.

In use, embodiments of the present invention facilitate isolation of a section of a pipe for repair and/or replacement.

The first plug module may be urged through the pipe in a first direction, for example from a first end of the pipe, and the second plug module may be urged through the pipe in a second, opposing, direction, for example from a second end of the pipe.

Beneficially, embodiments of the present invention facilitate isolation of a section of pipe comprising a restriction, for example resulting from a dent in the pipe, which may otherwise hinder or prevent passage of an isolation tool through the pipe.

For example, the first plug module may be located in the pipe at a first side of a restriction and the second plug module may be located in the pipe at a second side of the restriction. In particular embodiments, the second plug module may be located in the pipe at a second side of the restriction while the first plug module is in the second, fluid bypass, mode. Accordingly, fluid displaced by location of the second plug module may bypass the first plug module, thereby mitigating or eliminating the risk of damage to the pipe caused by increased pressure in the pipe and facilitating pig movement.

The first plug module may be lockable to the pipe. In use, the first plug module may be locked to the pipe wall while permitting fluid bypass of the first plug module. The first plug module may also, or alternatively, be locked to the pipe in the third mode, for example when it is desired to isolate a section of pipe comprising a restriction.

The first plug module may comprise a lock arrangement for locking the first plug module to the pipe. The lock arrangement may comprise any suitable arrangement and may, for example, comprise a taper lock arrangement.

The second plug module may be lockable to the pipe, for example when the second plug module has reached the desired location in the section of pipe. The second plug module may comprise a lock arrangement for locking the second plug module to the pipe. The lock arrangement may comprise any suitable arrangement and may, for example, comprise a taper lock arrangement or the like.

The first plug module may be configured to seal the pipe and may comprise a seal arrangement for engaging the pipe wall when it is desired to isolate the section of pipe. The seal arrangement may comprise any suitable arrangement and may, for example, comprise a compression seal or the like. In some embodiments, the seal arrangement may be self-energized by a fluid pressure differential across the first plug module.

The second plug module may be configured to seal the pipe and may comprise a seal arrangement for engaging the pipe wall when it is desired to isolate the section of pipe. The seal arrangement may comprise any suitable arrangement and may, for example, comprise a compression seal or the like. In some embodiments, the seal arrangement may be self-energized by a fluid pressure differential across the second plug module.

The isolation tool may be of any suitable form. For example, the first plug module may comprise a single body comprising one or more pigging element, one or more seal arrangement and one or more lock arrangement. In particular embodiments, the isolation tool may comprise a multi-module isolation tool.

Fluid bypass of the first plug module may be achieved by any suitable means. For example, the first plug module may be configured to permit fluid bypass between the first plug module isolation seals and the pipe wall. Alternatively, the first plug module may define a fluid passage for directing fluid through the pigging bulkhead. The first plug module may further comprise a valve arrangement for controlling fluid bypass. The valve arrangement may be of any suitable form.

The isolation tool may further comprise a control and actuation system. In particular embodiments, the control/actuation system may comprise a hydraulic control system. Beneficially, this permits each plug module to be controlled/actuated independently and/or remotely. For example, in use, the first plug module may be pigged to the desired location in the pipe and set prior to the second plug module being pigged.

In use, the first plug module may be urged, or pigged, into the pipe, displacing fluid in the pipe in front of the first plug module. In the event that pipeline pressure exceeds acceptable levels, the first plug module may be locked to the pipe and the plug module configured to the second, fluid bypass, mode to relieve or equalize pressure across the first plug module. The first plug module may be configured in the first mode while locating the first plug module in the pipe. For example, by configuring the first plug module to prevent fluid bypass, fluid in the pipe may be used to urge, or pig, the first plug module through the pipe.

When the pressure returns to acceptable levels, or it is again desired to urge the first plug module through the pipe, the first pigging plug module may be configured to the first mode.

On reaching the desired location in the pipe, for example at the first side of a restriction, the first plug module may be secured to the pipe and configured to the second, fluid bypass, mode. Fluid displaced by movement of the second plug module will bypass the first seal module.

Accordingly, embodiments of the present invention facilitate fluid-tight isolation of a section of a pipe having a restriction which may then be repaired and/or replaced, while mitigating or eliminating the risk of damaging or rupturing the pipe.

According to a further aspect of the present invention there is provided a plug module according to the first and/or second aspect.

It should be understood that the features defined above in accordance with any aspect of the present invention or below in accordance with any specific embodiment may be utilized, either alone or in combination with any other defined feature, in any other aspect of the invention.

BRIEF DESCRIPTION OF THE DRAWINGS

These and other aspects of the present invention will now be described, by way of example only, with reference to the accompanying drawings, in which:

FIG. 1 is a diagrammatic view of a pipeline system into which is loaded a first plug module of an isolation tool according to an embodiment of the present invention;

FIG. 1a is an enlarged view of part of FIG. 1, showing the first plug module;

FIG. 3a is an enlarged view of the first plug module, with a lock module set and a bypass passage open;

FIG. 6a is an enlarged view of the first plug module, with a lock module set and a bypass passage open;

DETAILED DESCRIPTION

Figure 2:
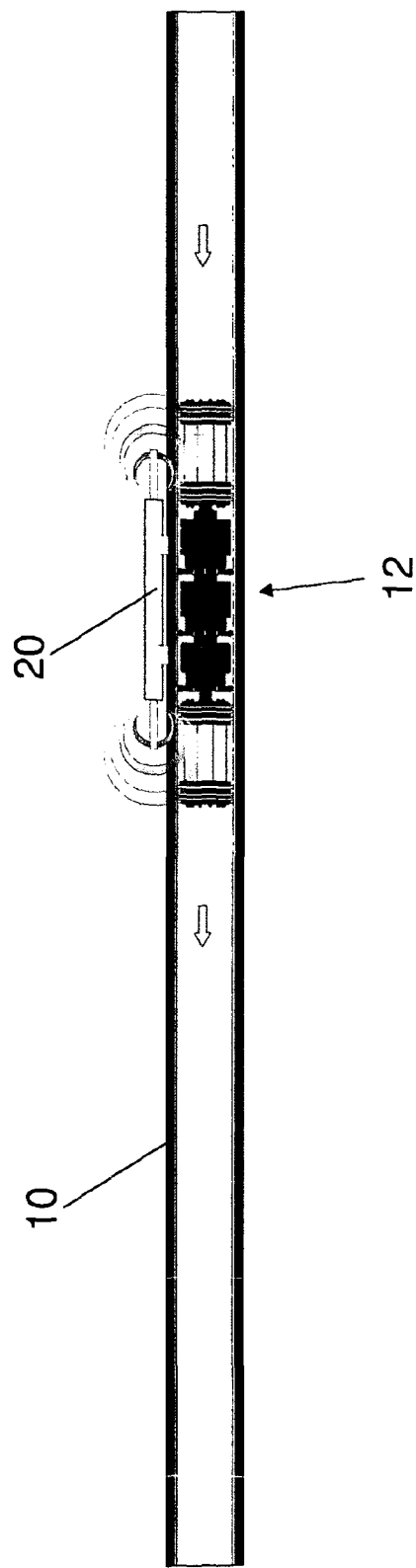
FIG. 2 is a diagrammatic view of another part of the pipeline system, showing the first plug module of FIG. 1 as it travels towards the location where it is desired to set the plug module in the pipeline.

An isolation tool and method according to an embodiment of the present invention will now be described with reference to a pipe comprising a restriction in the form of a dent. In the embodiment described, the isolation tool is adapted for location in the pipe and comprises a first plug module and a second plug module. The first plug module is configurable: to grip the pipe and permit fluid bypass; to prevent fluid bypass without gripping the pipe; and to isolate the pipeline with gripping and leak tight sealing, allowing a section of pipe to be fully de-pressurised.

In use, the first and second plug modules are inserted into opposite ends of the pipe. The first plug module is pigged to a first location while in the second mode, that is with a seal against the pipe but no grip. The first plug module is then configured in the fluid bypass mode when the second plug module is travelling through the pipe so that fluid displaced by the second plug module bypasses the first plug module. The second plug module and first plug module are then sealingly secured to the pipe to isolate a section of the pipe wall having the restriction.

Each of the first and second plug modules comprises a pigging module, a sealing module and a lock module. The pigging module has a hydraulically actuated bypass valve. The bypass valve is of substantial diameter relative to the pipe bore and may, for example, be of a diameter approximately ¼ of the pipe bore. Over the short length of the plug module, this will generate a relatively small differential pressure for pigging flows.

In the embodiment described, the lock module and seal module do not themselves have a pigging array and would have a significant fluid bypass between the respective module and the pipe wall.

In use, the first plug module is positioned in a launcher and is propelled, or pigged, from the launcher into the pipe by fluid pressure acting on the pigging module. Although a launcher is described, it will be recognized that any suitable means for inserting and propelling the first plug module into the pipe may be used. The first plug module, normally the furthest from the restriction or dent, is pigged into the pipe and displaces the fluid in the pipe in front of the plug module In a pipeline where there is limited capability for venting fluid from the pipe, the fluid in front of the first plug module is compressed (or "packed"). Once the pressure in front of the first plug module approaches the pipeline limit, the first plug module can be stopped, the lock set and a pressure equalization valve inside the pigging module opened. The pipeline pressure on both sides of the first plug module can then be reduced. When the pressure is reduced to the original pressure, the pressure equalization valve can be closed, the lock can be released and pigging recommenced.

Once the plug reaches the set location adjacent to the pipe dent, the lock module is set and the pressure equalization valve in the pigging module opened (or where more than one pigging module is provided, the pressure equalization valves are opened). The lock module is hydraulically activated to grip the pipe without the requirement to set the seal module, this permitting the bypass of the isolation seal. Indeed, the lock segments are configured so as to provide a significant fluid bypass when set.

The second plug module is then launched from the other end of the pipe, normally the closest end to the dent, and pigged towards the dent. The pipeline fluid in front of the second plug module is displaced through the fluid bypass in the first plug module. As the first plug module is configured in the fluid bypass mode at this time, the full pipeline outboard of the dent can be used for packing or venting the pressure, as opposed to the limited volume which would otherwise be available if the first plug module prevented fluid bypass past the first plug module.

Once the second plug module reaches its set location adjacent to the damaged pipe, it is hydraulically set by engaging the seal and lock of the second plug module with the pipe. The first plug module is then fully set by engaging the seal module with the pipe wall, thereby isolating the damaged pipe section from the main pipe.

One or more small bore hot taps in the pipe can then be performed using mechanical clamps, such as self energised strap clamps available from STATS (UK) Limited, to facilitate safe venting and flushing of this isolated pipe section prior to cutting and replacing the damaged section.

After the pipe is repaired, the plug modules can be unset and pigged together to a receiver.

Operation of an embodiment of the invention will now be described with reference to FIGS. 1 to 15 of the drawings. It will be recognized that the illustrated embodiment described below may comprise some or all of the features described above.

FIG. 1 shows a pipeline system 10 into which is loaded a first, downstream, plug module 12 of an isolation tool according to an embodiment of the present invention.

FIG. 1a shows an enlarged view of part of the pipeline system 10 shown in FIG. 1, showing the first plug module 12. In the embodiment shown, the first plug module 12 comprises five modules: two pigging modules 13; a lock module 15 and two seal modules 17. The modules 13, 15 and 17 are interconnected by ball joints 19, although other suitable joints such as universal joints may be used where appropriate. An articulated plug module 12 beneficially permits the module 12 to pass through bends in the pipeline 10, in particular bends having a curvature which may otherwise cause a unitary module to become stuck.

The pigging modules 13 each have a body 21 around which are mounted polyurethane discs 23 which engage the inner wall of the pipeline 10. In use, fluid pressure acts on the body 21 and discs 23 to urge the plug module 12 through the pipeline 10. In the embodiment shown, six discs 23 are provided (the inboard pair of discs 23 are thicker to provide support) on each pigging module 13, this permitting the plug module 12 to be pigged even where one or more of the discs 23 loses contact with the pipe 10, as may the case for example where the module 12 traverses a branch or encounters sections of pipe of different dimensions. The pigging modules 13 also comprise means (not shown), for example a hydraulic pump, for providing hydraulic power to operate the other modules 15, 17.

Lock module 15 comprises a taper lock arrangement, whereby hydraulic fluid pressure acts to move a tapered mandrel (not shown) axially relative to a plurality of correspondingly tapered lock segments 25 to move the lock segments radially outwards to engage and grip the inner wall of the pipe 10. The lock module 15 is also provided with wheels 27 which engage the inner wall of the pipe 10 and which assist in positioning and transporting the lock module 15 through the pipeline 10.

Seal modules 17 each comprise a body 29 having one or a plurality of compression seal elements 31 provided between flanges 33, 35. In use, hydraulic fluid pressure acts on one or both of the flanges 33, 35 to compress the seal element or elements 31. Compression of the, or each, seal element 31 causes the element 31 to move radially outwards to sealingly engage the inner wall of the pipe 10. The seal module 17 is also provided with wheels 37 which engage the inner wall of the pipe 10 and which assist in positioning and transporting the seal module 15 through the pipeline 10.

In this first step shown in FIG. 1, the first plug module 12 is loaded into a receiver 14. Pipeline fluid pressure 16 acts on the module 12, and urges the plug module 12 through the pipeline 10 in the direction of arrows 18.

FIG. 2 shows the plug module 12 as it travels towards the location where it is desired to set the first plug module 12 in the pipeline 10. In the illustrated embodiment, the first plug module 12 receives a signal from a communication device 20 mounted to an outer wall of the pipeline 10. The communication device 20 instructs the plug module 12 to slow its rate of travel as it approaches the desired set location. The communication device 20 may form part of a control system for the isolation tool. It will be recognized that any other suitable means for monitoring and controlling the speed of the plug module 12, such as onboard telemetry, may be utilized where appropriate.

Figure 3:
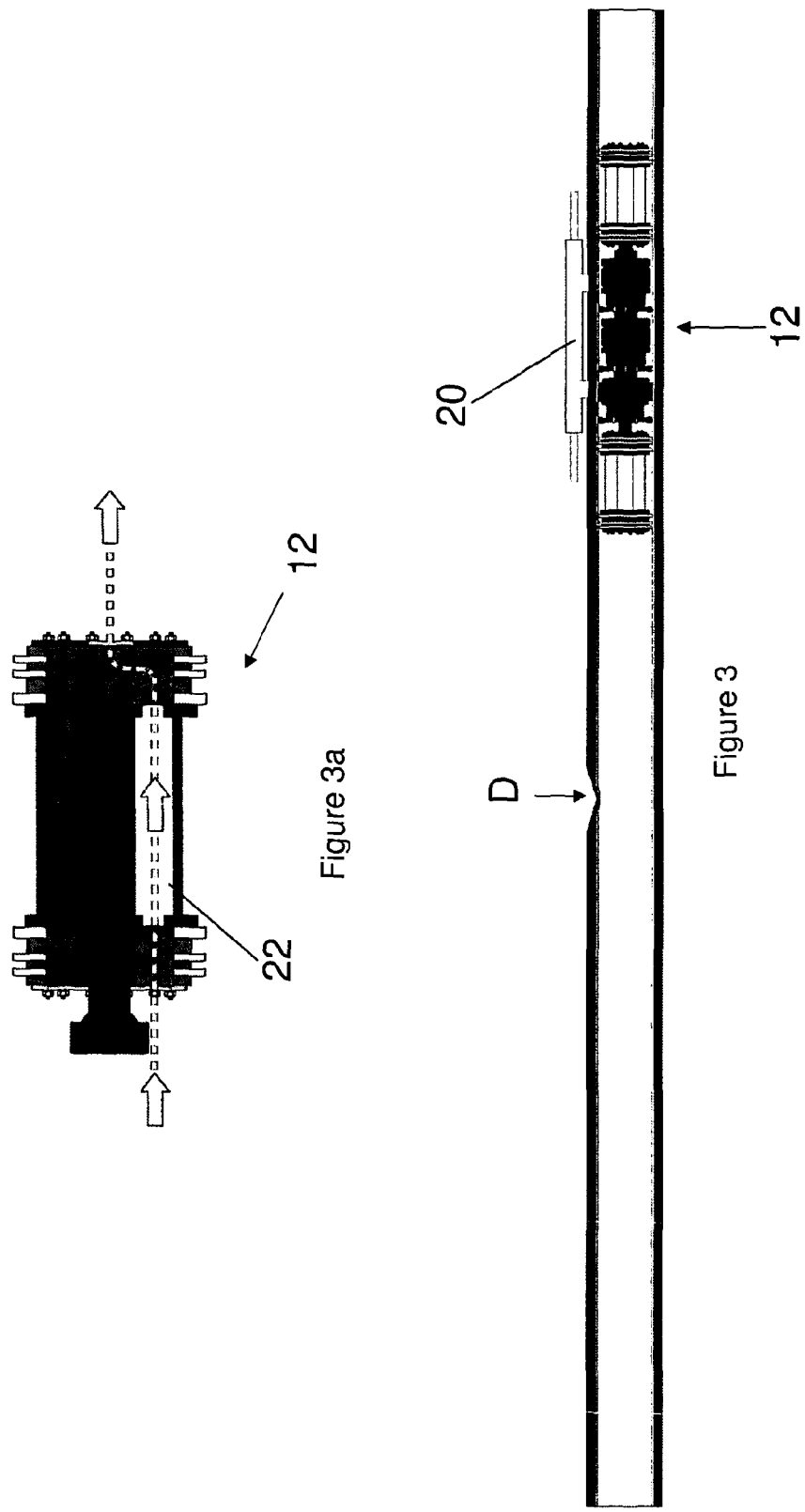
FIG. 3 is a diagrammatic view of another part of the pipeline system, showing the first plug module on arrival at the desired set location, downstream of a damaged pipe section.

Referring now to FIG. 3, and also to FIG. 3a which shows an enlarged view of part of the module 12, on arrival at the desired set location, a lock module of the first plug module 12 is set to secure the first plug module 12 in place in the pipeline 10 and a bypass passage 22 (see FIG. 3a) is opened to permit fluid to bypass the first plug module 12. In this way, fluid travelling in the opposite direction to the direction of travel of the first plug module 12 (that is, to the right in the Figure), is able to bypass the first plug module 12, mitigating or obviating the fluid pressure building up around the damaged section of the pipeline 10, shown as dent D.

Figure 4:
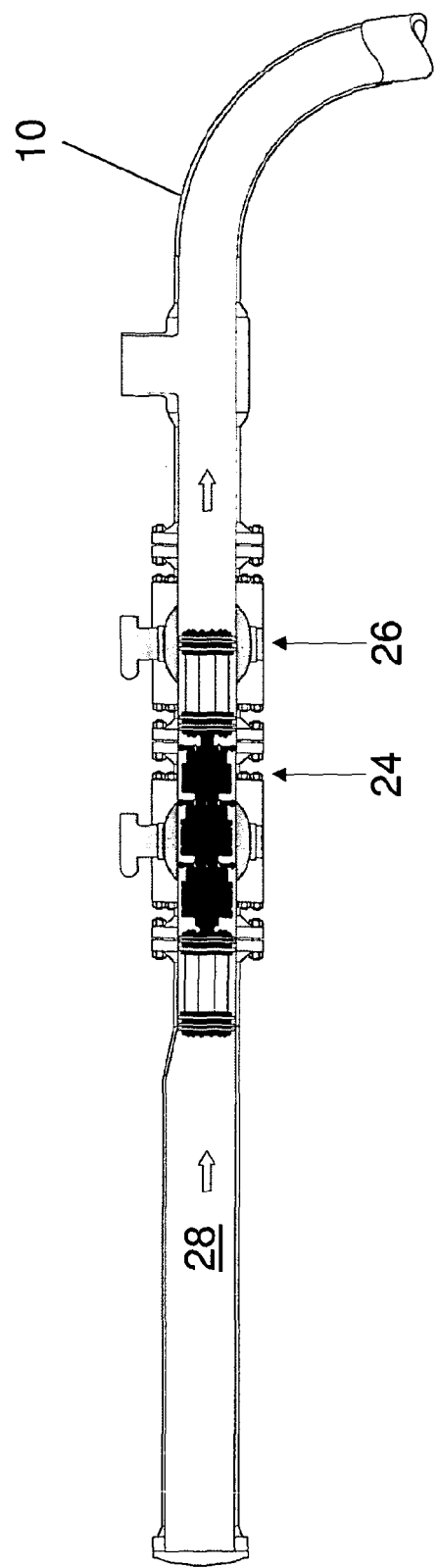
FIG. 4 is a diagrammatic view of an upstream part of the pipeline system, into which is loaded a second plug module of the isolation tool.

FIG. 4 shows an upstream section of the pipeline 10 into which is loaded a second, upstream, plug module 24. The second plug module 24 comprises similar features and is of similar construction to the first plug module 12.

In this step, the second plug module 24 is loaded into a launcher 26 and urged towards the first plug module 12. In the embodiment shown, a pigging fluid, for example glycol 28, may be used to urge the second plug module 24 a distance, for example around 50 meters, through the pipeline 10.

Figure 5:
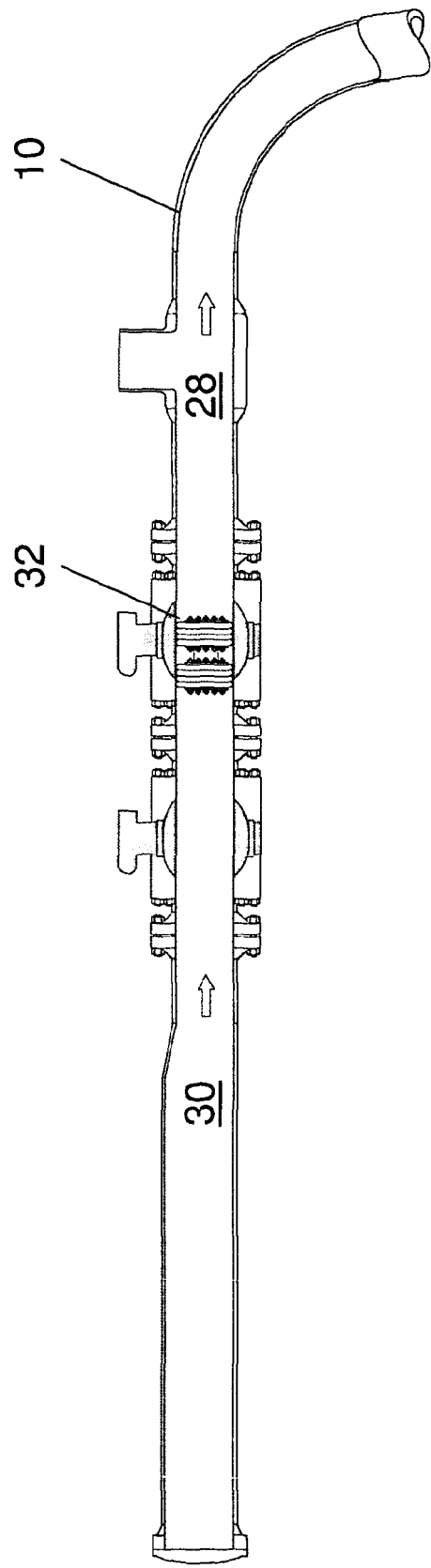
FIG. 5 is a diagrammatic view of the same part of the pipeline system shown in FIG. 4, showing a bi-directional plug located in the pipeline.

After the second plug module 24 has been urged through the pipeline 10 a selected distance, another fluid, such as gas 30, may be used to continue to urge the second plug module 24 towards the first plug module 12 and towards the damaged section D of the pipeline 10, as shown in FIG. 5. A bi-directional plug 32 is located in the pipeline 10 and is also directed through the pipeline 10 behind the second plug module 24.

Figure 6:
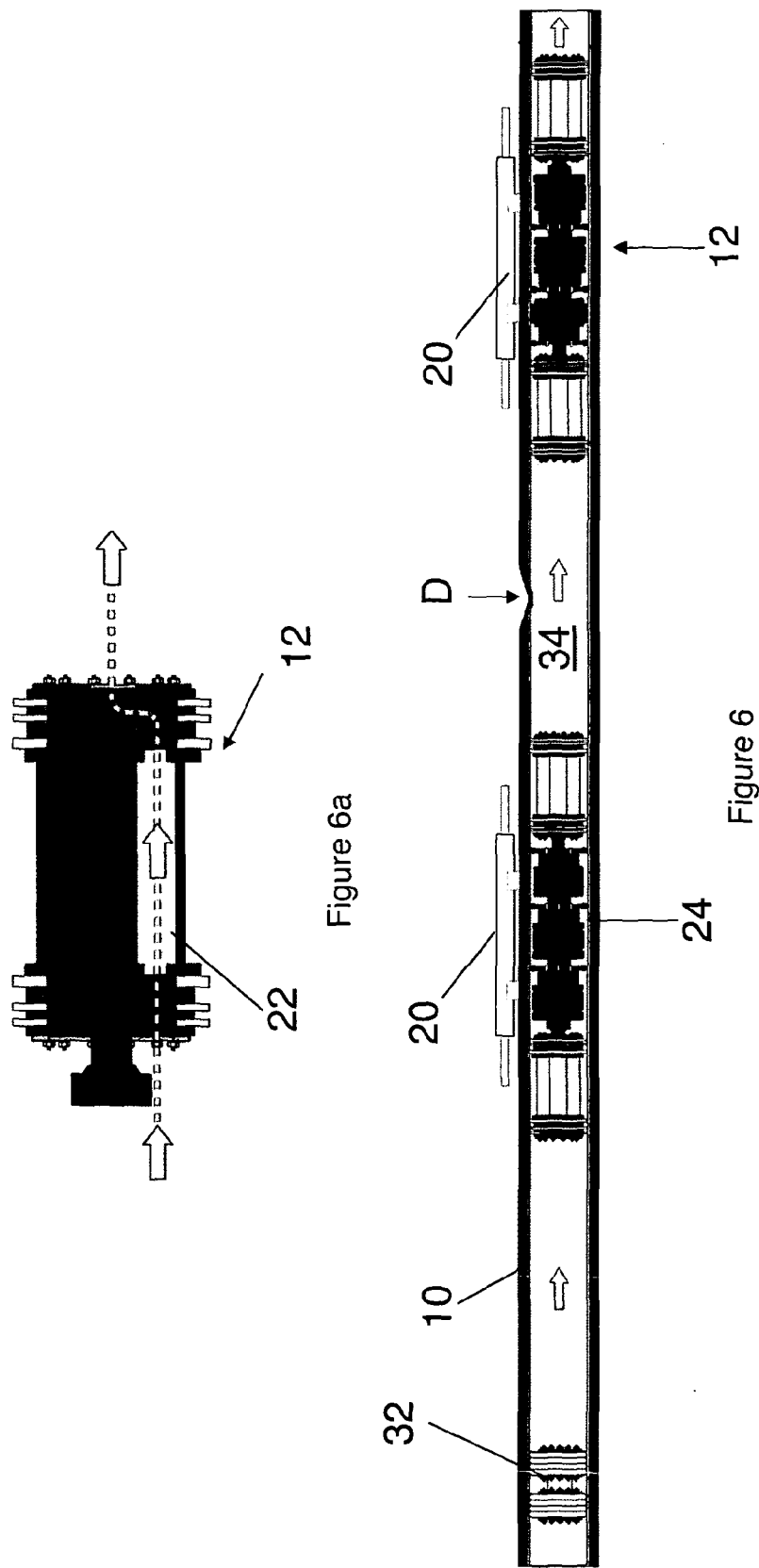
FIG. 6 is a diagrammatic view of the part of the pipeline system shown in FIG. 3, showing the first pipe module and the second plug module on arrival at its desired set location, upstream of the damaged pipe section.

Referring to FIG. 6, the second plug module 24 has been urged through the pipeline 10 and has reached its desired set location, upstream of the damaged pipe section D. Gas 34 outboard of the plug module 24 will be displaced through the bypass passage 22 of the first, downstream, plug module, as shown in FIG. 6a. A lock module of the second plug module 24 is set to secure the second plug module at the desired location.

Figure 7:
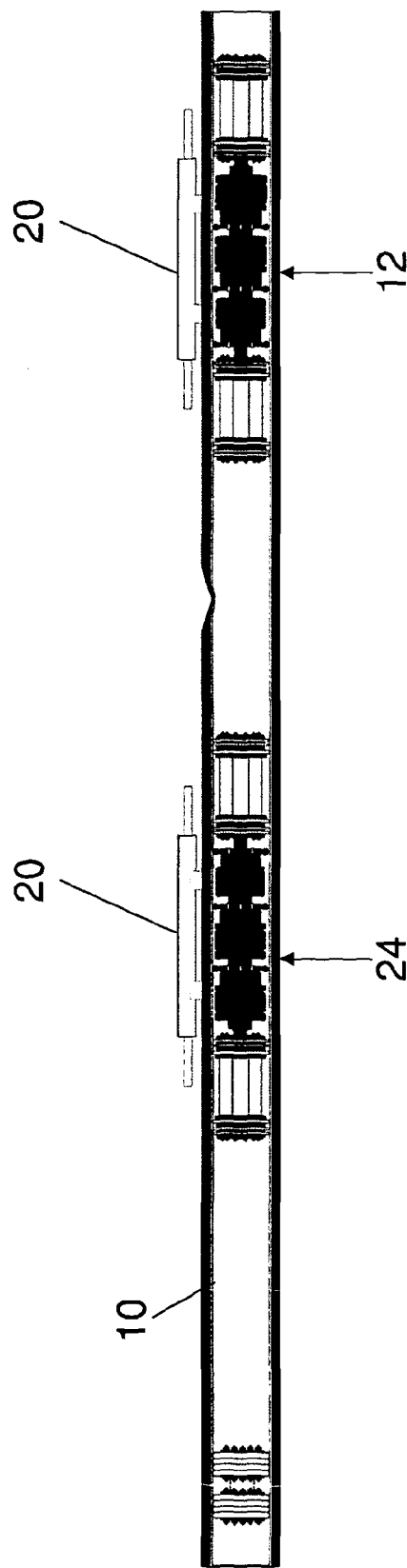
FIG. 7 is a diagrammatic view of the section of the pipeline system shown in FIG. 6, showing a communication device for communicating with the second plug module.

As shown most clearly in FIG. 7, a communication device 20 is also provided adjacent to the second plug module 24 on an outer wall of the pipeline 10 for communicating with the second plug module 24.

Figure 8:
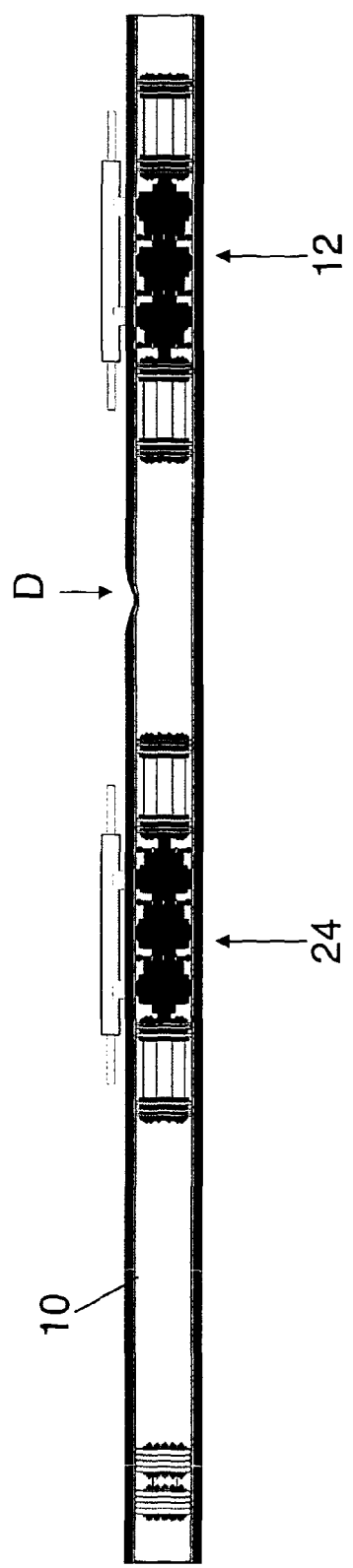
FIG. 8 is a diagrammatic view of the section of the pipeline system shown in FIG. 6, wherein seal modules on each of the first and second plug modules are set.

In the step shown in FIG. 8, seal modules on each of the first and second plug modules 12, 24 are set to sealingly secure the modules 12, 24 in the pipeline 10 and isolate a section of the pipeline 10 surrounding the damaged pipe section D.

As the damaged pipe section D of the pipeline 10 has been isolated, it is now possible to perform further operations on the damaged pipe section D.

Figure 9:
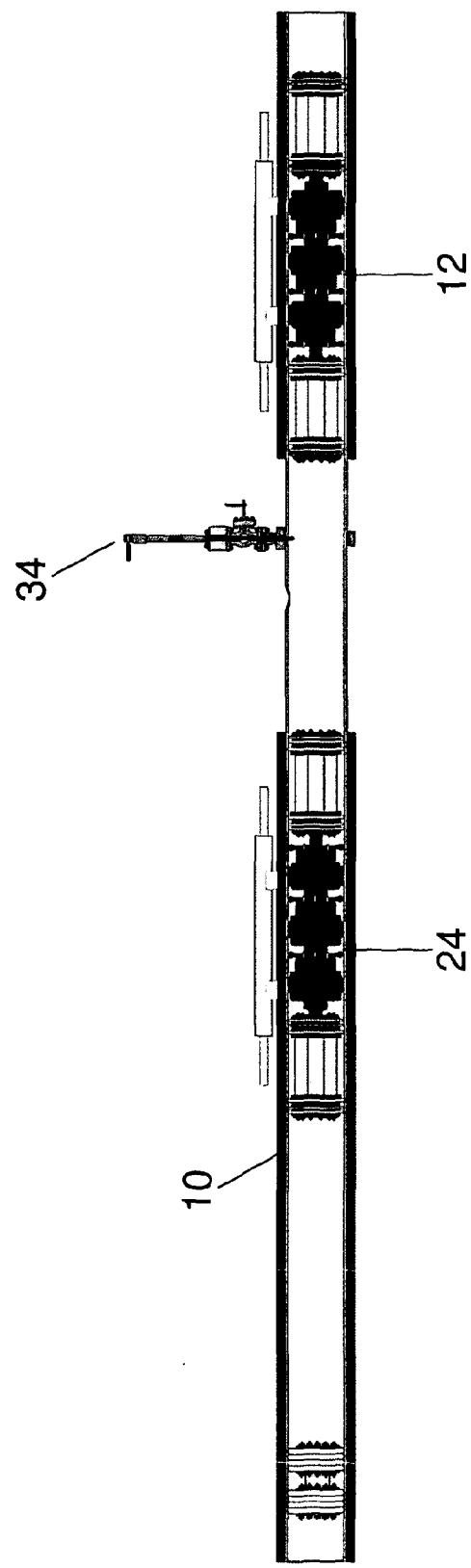
FIG. 9 is a diagrammatic view of the section of the pipeline system, showing the step of breaching the pipeline using a hot tap tool.

FIG. 9 shows the step of breaching the pipeline 10 using a hot tap tool 34.

Figure 10:
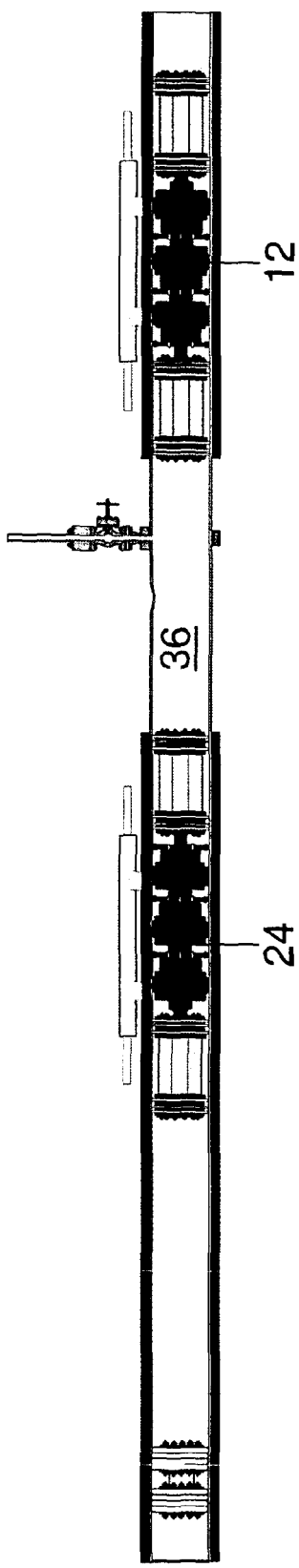
FIG. 10 is a diagrammatic view of the section of the pipeline system, showing the step of venting fluid pressure and performing secondary seal tests.

Once access to the pipeline 10 has been achieved, and as shown in FIG. 10, fluid pressure between the plug modules 12, 24 may be vented and secondary seal tests may be performed.

Figure 11:
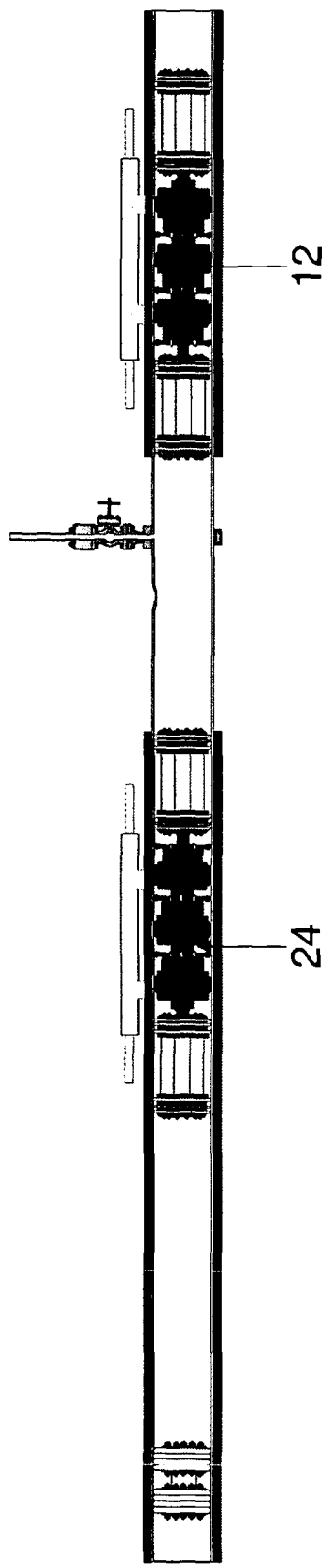
FIG. 11 is a diagrammatic view of the section of the pipeline system, showing the step of venting plug annulus pressures and testing primary seals.

In a further step, and as shown in FIG. 11, plug annulus pressures are vented and primary seals are tested.

Figure 12:
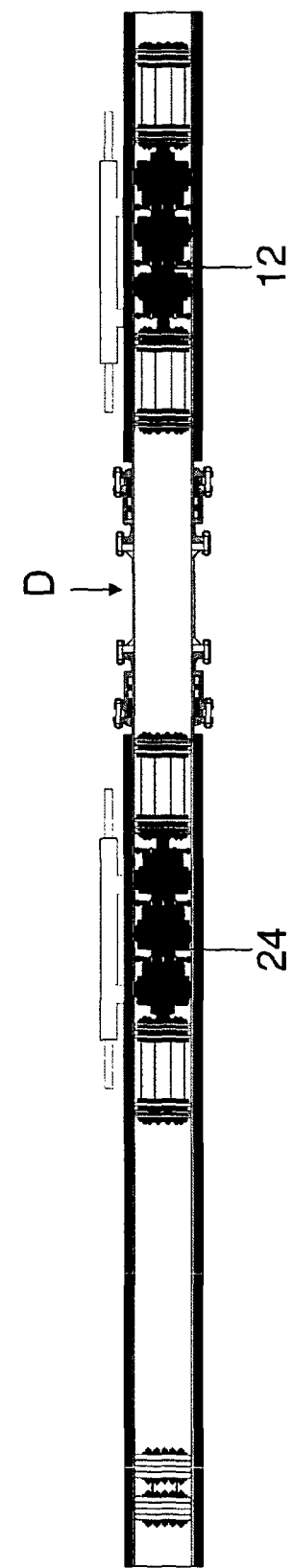
FIG. 12 is a diagrammatic view of the section of the pipeline system, showing the step of repairing or replacing the damaged pipe section.

Once tests have been carried out, the damaged section D of the pipeline 10 may be repaired or replaced, as shown in FIG. 12.

Figure 13:
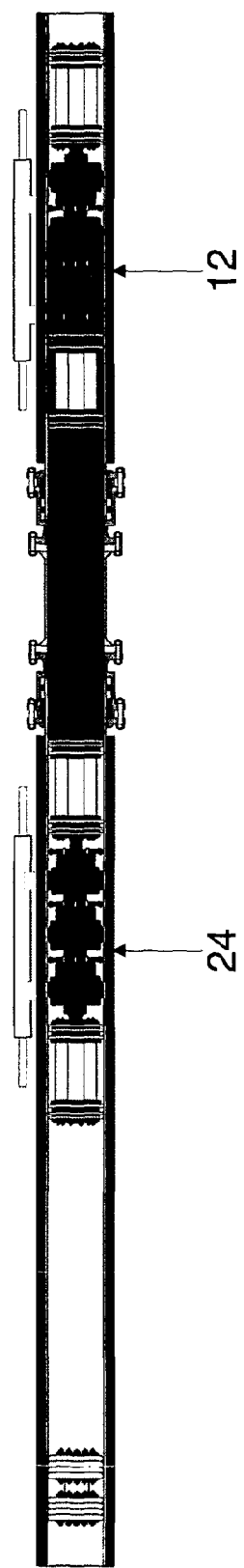
FIG. 13 is a diagrammatic view of the section of the pipeline system, showing the step of equalizing pressure to pipeline pressure.
Figure 14:
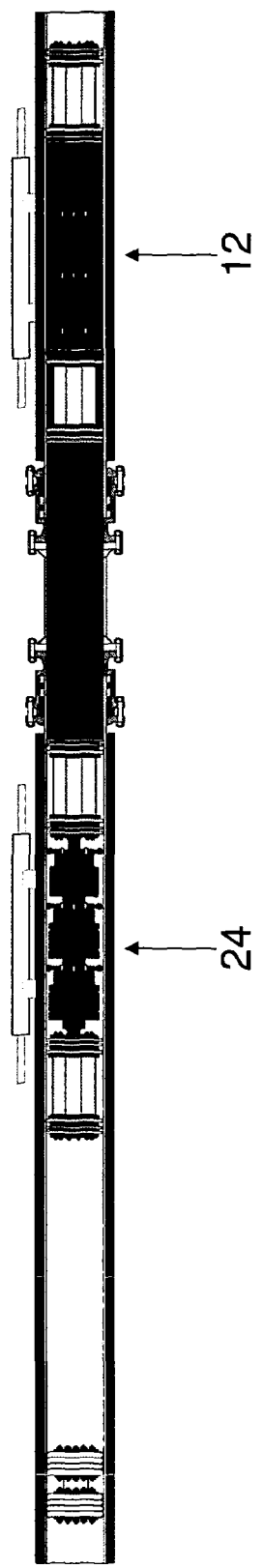
FIG. 14 is a diagrammatic view of the section of the pipeline system, showing. the step of unsetting the plug modules.
Figure 15:
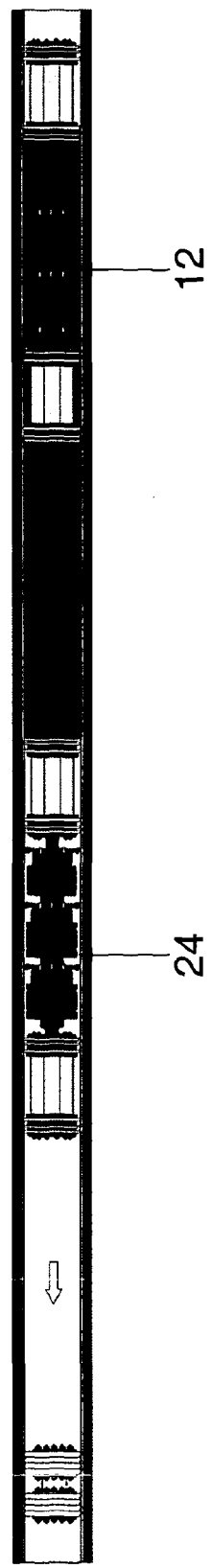
FIG. 15 is a diagrammatic view of the section of the pipeline system, showing the step of urged the plug modules to a receiver.

Once the section of pipeline 10 has been repaired or replaced, and referring to FIG. 13, pressure equalization valves on the plug modules 12, 24 may be used to raise pressure between the plug modules 12, 24 to pipeline pressure. The plug modules 12, 24 may then be unset (FIG. 14) and the plug modules 12, 24 urged to a receiver (FIG. 15).

It should be understood that the embodiment described herein is merely exemplary and that various modifications may be made thereto without departing from the scope of the invention. For example, while the method described above describes hydraulic operation of valves and locks to grip the pipe, it will be understood that any suitable means of actuation may be used. For example, the seals and/or locks may be electrically actuated, pneumatically actuated or mechanically actuated.

The control system for the bypass and lock may be separate from the remote plug control or integral for the system to work. For example, the instruction to activate the bypass (activate grip and open pigging bypass) could be by through wall communication such as ELF, radiation, acoustic or magnetic communication means, along the pipe such as by acoustic or pressure means, or this may be automatic.

In addition, any suitable locking means may be utilized to secure the plug modules in the pipe, including for example ball grab, magnetic, high friction discs and/or inflatable devices.

Although the seal module, the lock module and the pigging module have been described separately, one or more of these may be provided on a single module.

The control system may also be configured to control the position of each plug module and may comprise a braking mechanism to stop a module at a given point in the pipe. For example, this could be achieved via control of the bypass valve, opening of the valve removing the drive from the plug module. The locking module may also, or alternatively, be provided with a brake arrangement, including for example one or more wear pad.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A method for isolating a section of a pipe, the method comprising the steps of:
   locating a first plug module of an isolation tool in a pipe in a first mode using a sealing pigging array with no or minimal bypass;
   configuring the first plug module in a second mode to permit fluid bypass of the sealing pigging array and the first plug module;
   securing the first plug module against the pipe;
   configuring the first plug module in a third mode to isolate a section of the piep, retaining pressure on one side of the isolation tool while allowing an other side to be fully vented;
   locating a second plug module in the pipe while the first plug module is in the second mode and urging the second plug module towards the first plug module such that fluid displaced by location of the second plug module bypasses the first plug module;
   securing the second plug module and the first plug module to the pipe to isolate the pipe section between the first plug module and the second plug module; and
   configuring the first plug module in the first mode to prevent fluid bypass of the sealing pigging array for pigging both the first plug and the second plug modules to one end of the pipe for removal.

2. The method of claim 1, further comprising securing the second plug module and the first plug module to the pipe to isolate a mid section between the first plug module and the second plug module using double block and bleed isolation.

3. The method of claim 1, comprising urging the first plug module through the pipe in a first direction and urging the second plug module through the pipe in a second, opposing, direction.

4. The method of claim 1, comprising locating the first plug module in the pipe at a first side of a restriction and locating the second plug module in the pipe at a second side of the restriction.

5. The method of claim 4, comprising locating the second plug module in the pipe at a second side of the restriction while the first plug module is in the second mode.

6. The method of claim 1, comprising locking the first plug module to the pipe.

7. The method of claim 6, wherein the first plug module is locked to a wall of the pipe while permitting fluid bypass of the first plug module.

8. The method of claim 6, wherein the first plug module is locked to the pipe in the third mode.

9. The method of claim 1, comprising locking the second plug module to the pipe.

10. The method of claim 9, wherein the second plug module is locked to the pipe when the second plug module has reached a desired location in the section of pipe.

11. The method of claim 1, comprising at least one of:
    configuring the first plug module to seal the pipe; and/or
    configuring the second plug module to seal the pipe.

12. An isolation tool comprising:
    a first plug module configured for location in a pipe in a first mode using a sealing pigging array with no or minimal bypass, the first plug module configurable in a second mode to permit fluid bypass of the pigging array and the first plug module while securing the first plug module against the pipe and configurable in a third mode to isolate the pipe;
    a second plug module configured for location in the pipe, the second plug module configured to be urged towards the first plug module while the first plug is in the second mode such that fluid displaced by location of the second plug module bypasses passes the first plug module;
    wherein the second plug module and the first plug module are secured to the pipe to isolate a section of the pipe between the first plug module and the second plug module; and
    the first plug module configured in the first mode to prevent fluid bypass of the sealing pigging array for pigging both the first plug module and the second plug module to an end of the pipe for removal.

13. The isolation tool of claim 12, wherein at least one of the first plug module and the second plug module comprise a lock arrangement for locking the first plug module to the pipe.

14. The isolation tool of claim 13, wherein the lock arrangement comprises a taper lock arrangement.

15. The isolation tool of claim 12, wherein at least one of the first plug module and the second plug module comprise a seal arrangement for engaging a wall of the pipe.

16. The isolation tool of claim 15, wherein at least one of:
    the seal arrangement comprises a compression seal; and/or
    the seal arrangement is configured to be self-energized.

17. The isolation tool of claim 12, wherein at least one of:
    the first plug module is configured to permit fluid bypass between the first plug module isolation seals and a wall of the pipe; and/or
    the first plug module defines a fluid passage for directing fluid through the tool; and/or
    the first plug module comprises a valve arrangement for controlling fluid bypass.

18. The isolation tool of claim 12, further comprising a control and actuation system.

19. The isolation tool of claim 18, wherein at least one of the control and actuation system comprises a hydraulic control system, and each plug module is controlled/actuated independently and/or remotely.

* * * * *